United States Patent
Zaehe

[19]

[11] Patent Number: 6,039,070
[45] Date of Patent: Mar. 21, 2000

[54] PILOT OPERATED PRESSURE VALVE

[75] Inventor: Bernd Zaehe, Linnich, Germany

[73] Assignee: Sun Hydraulics Corp., Sarasota, Fla.

[21] Appl. No.: 09/189,613

[22] Filed: Nov. 9, 1998

[51] Int. Cl.⁷ .................................................. G05D 16/10
[52] U.S. Cl. ............................................................ 137/491
[58] Field of Search ............................................. 137/491

[56] References Cited

U.S. PATENT DOCUMENTS 4,653,527  3/1987  Kosarzecki .
5,050,636  9/1991  Sagawa et al. .

*Primary Examiner*—Gerald A. Michalsky
*Attorney, Agent, or Firm*—Charles J. Prescott

[57] ABSTRACT

A pilot operated pressure valve which limits the rate of pressure rise and substantially eliminates excessive system pressure spikes, the valve including an inlet, a hollow cylindrical main body sealingly connected at one end thereof to the inlet, a pilot chamber having a sleeve slidably mounted within the main body and an operating pressure adjustment connected to another end of the main body adjacent another end of the pilot chamber for varying the operating pressure of the valve. A main chamber receives pressurized fluid metered through a main orifice and discharges pressurized fluid through a damping orifice when the main chamber is filled and fluid inlet pressure exceeds a preselected inlet pressure level sufficient to open a spring biased pilot ball downstream of the damping orifice. The inlet will open an exit port upstream of the main orifice for discharging pressurized fluid from the valve back to a supply tank when inlet pressure exceeds the operating pressure. Pressurized fluid is also metered from the pilot chamber through a control orifice into a loading chamber to automatically further vary the operating pressure of the valve by including a relief valve for discharging pressurized fluid from said pilot chamber when fluid pressure exceeds the operating pressure.

3 Claims, 3 Drawing Sheets

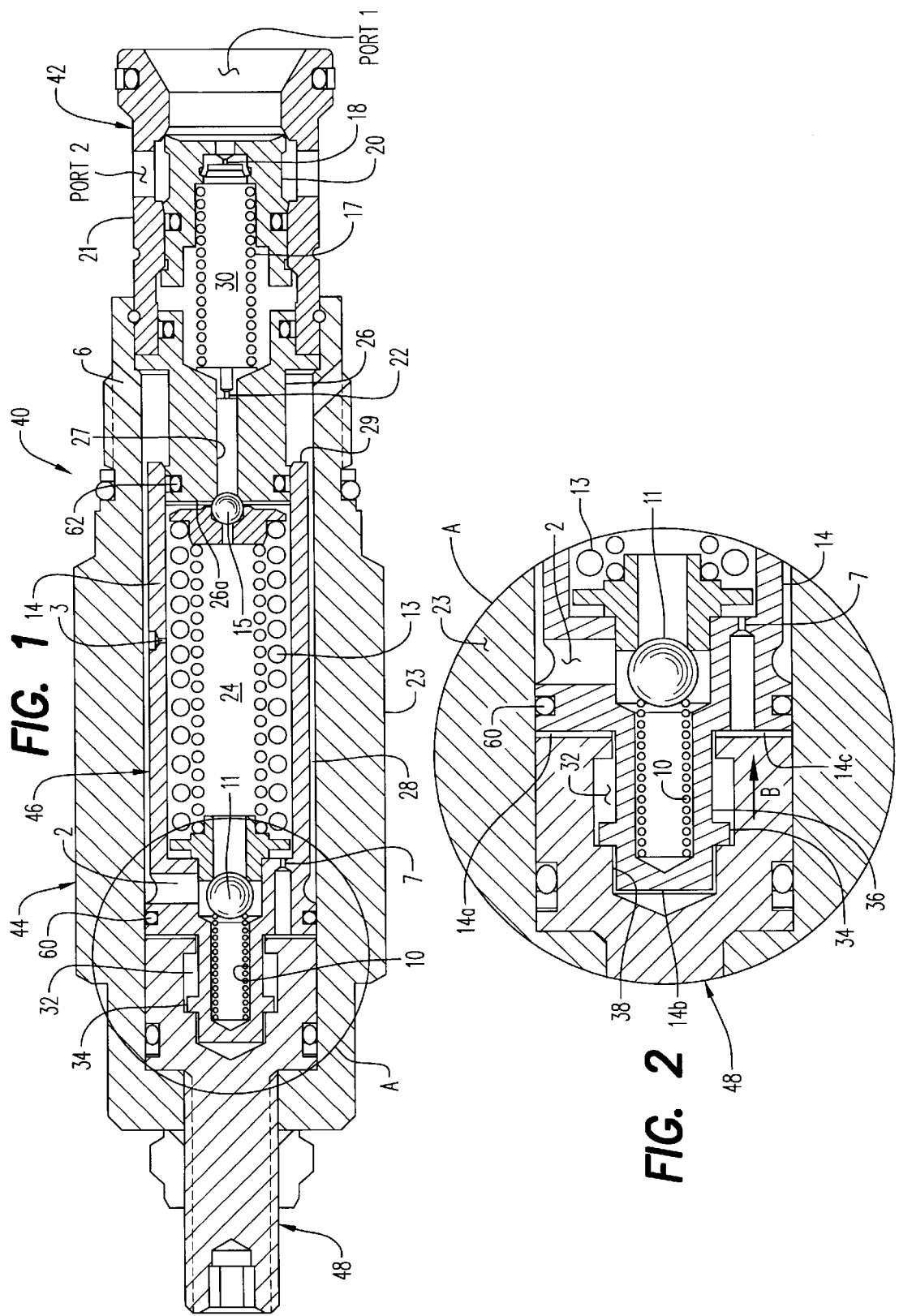

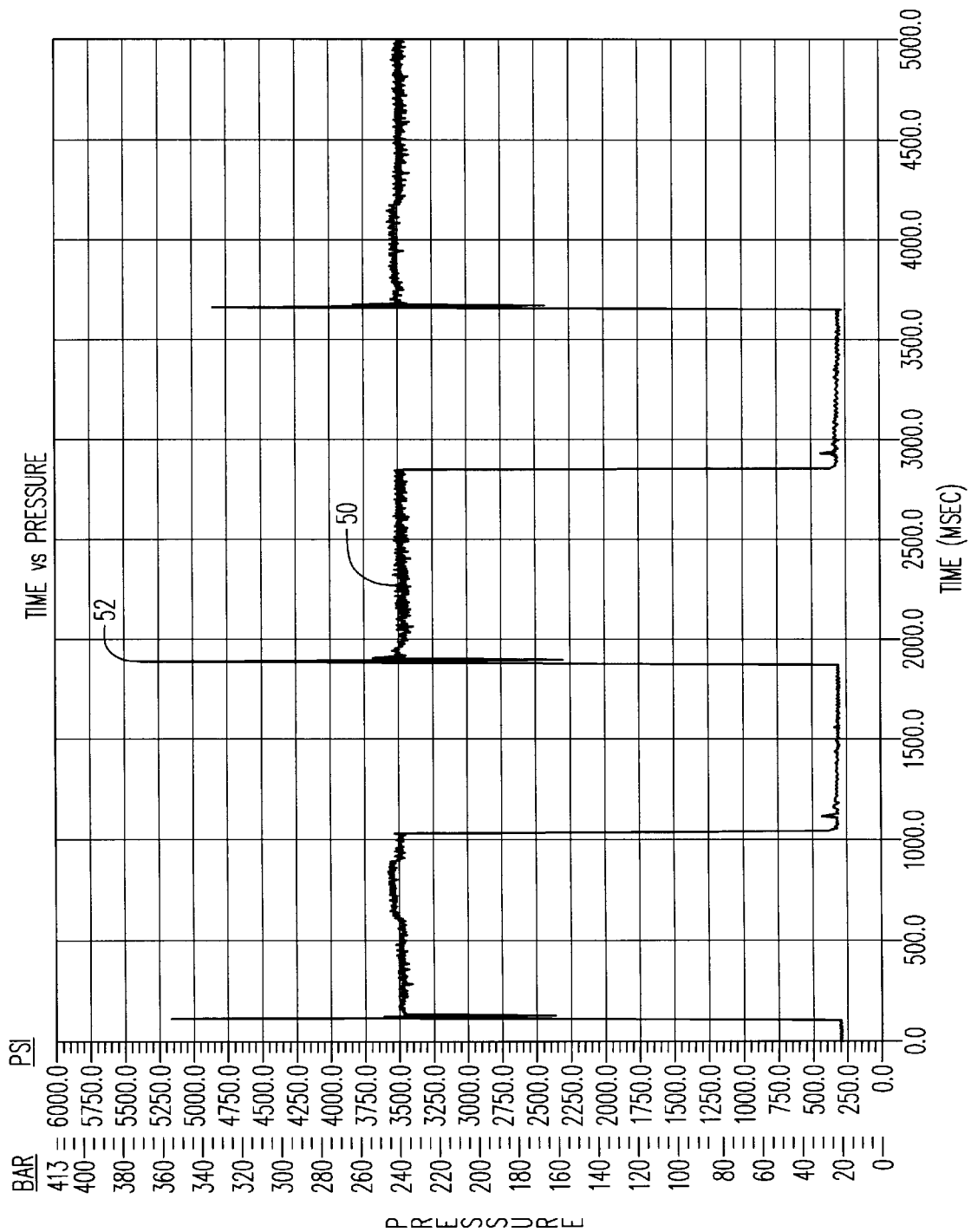

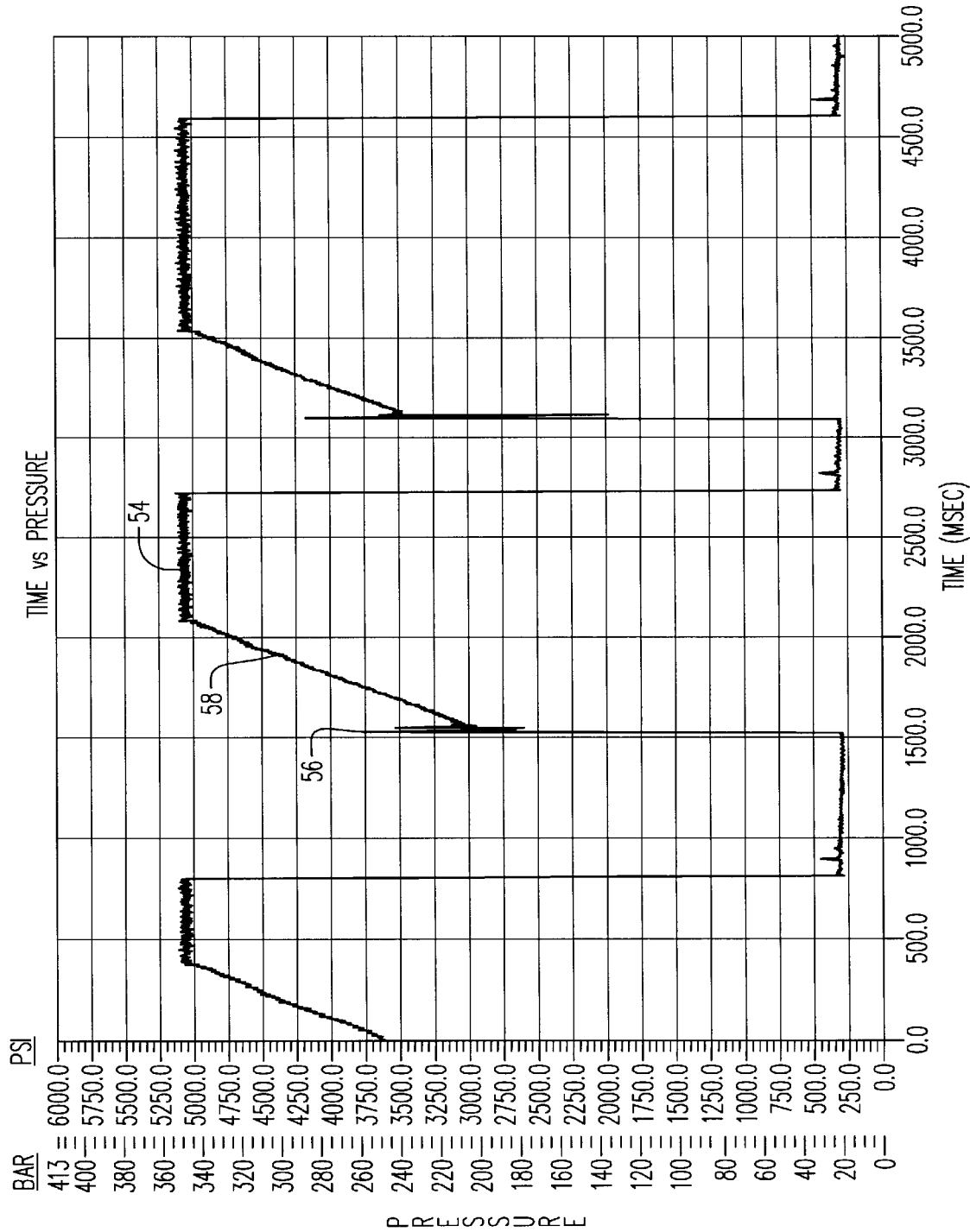

PILOT OPERATED PRESSURE VALVE

BACKGROUND OF THE INVENTION

1. Scope of Invention

This invention relates generally to pressure control valves in hydraulic systems, and more particularly to a pilot operated pressure valve which eliminates pressure spikes and hydraulic shock in such systems.

2. Prior Art

Pressure relief valves are used to provide a quick opening for excessive hydraulic pressure in a hydraulic system into which the valve is installed. These valves are characterized by a structure by which hydraulic pressure in the system is regulated by relieving and venting some of the pressurized fluid back to a supply tank or reservoir.

All conventional relief valves such as a differential piston relief valve or a pilot operated relief valve have a significant shortcoming when installed into a hydraulic system. When the hydraulic system is actuated so as to energize a hydraulic actuator, cylinder or motor, pressure increases virtually instantaneously As a result, there is a sharp hydraulic spike in the pressure level of the fluid system which results in excessively abrupt energizing of the hydraulic motor. Not only is this operational limitation abusive to the system, but it may also be operationally detrimental in that the equipment being operated will exhibit too sharp a start-up.

Other patented relief valves claiming a "soft start" feature are disclosed in U.S. Pat. No. 4,653,527 to Kosarzecki, in U.S. Pat. No. 5,050,636 invented by Sagawa and in U.S. Pat. No. 5,381,823 invented by DiBartolo. In each of these prior art valves, pressurized fluid flow into the valve acts to move an internal piston that further loads a spring which increases the maximum operating pressure setting of the valve.

A general technical problem with the above relief valves concerns the principal embodied in each that depends upon a very high pressure drop across a pilot orifice which varies somewhat proportional to inlet pressure. At high inlet pressure and at sudden pressure increases, the setting of the valve increases much faster than at a low pressure having a slower pressure increase. In order to realize technically reasonable flows, Kosarzecki and DiBartolo both reduce the effective throttle diameter by using a wire or pin in a hole thus creating a very small ring area. However, the flow across such arrangements is viscosity sensitive.

The friction of the moveable piston in each of these devices is a source of yet another problem in loading the pilot spring to increase the operating pressure. The moveable piston must seal high pressure against the low pressure both existing simultaneously within these prior art valves. DiBartolo uses two seals that see the full pressure drop across the valve. The resulting friction drastically effects the performance of the valve. Thus, DiBartolo had to increase the effective area of the piston that loads the pilot spring. By this arrangement the piston begins increasing the operating pressure setting of the valve at pressures much lower than the actual inlet pressure of the system. As a result, the valve is often prematurely set at a maximum setting thus having lost its damping or "soft start" feature altogether.

Kosarzecki reduced the friction of that valve by using a spool type piston without rubber seals. Although this device reduces the friction to a high degree, Kosarzecki still recommends an effective area for the spring-loaded piston that is ten percent (10%) greater than the effective area for the main piston. As a result, the setting of the valve is ten percent higher than the actual pressure if the inlet pressure remains steady for a period of time. Moreover, at sudden pressure increases, the Kosarzecki valve is closed first and pressure peaks cannot be eliminated. Further, this valve works only for a flow path which is "side-to-nose" which means that the operating pressure at the side of the valve is relieved to the nose thereof. The preferred flow path for cartridge valve is "nose-to-side" for many practical reasons.

The Sagawa patent reduces the friction at the loading piston by also using a spool-type piston without rubber seals. However, Sagawa also uses a differential area for this system so that the two diameters of the piston and the spool require very accurate manufacturing and concentricity.

These prior art soft start valves are direct acting relief valves. In contrast, the present invention is a pilot operated relief valve. As in other pilot operated relief valves, the pressure in the pilot chamber is much lower than the controlled pressure, but the loading mechanism always sees much higher pressure. Since the mechanism that changes the setting of the valve in the present invention is on the pilot side of the valve, this mechanism sees much lower pressures than the existing valves. That makes it possible to change the setting of the valve slowly and with low hysteresis.

The general principal incorporated in the present invention involves limiting the pilot chamber pressure and rate of inlet pressure rise. This is accomplished in large part by positioning the variable spring loader mechanism in the very low pressure in the pilot chamber just sufficient to fully bias the pilot chamber spring to its maximum pressure setting. Moreover, the operating pressure at which the present invention opens slowly follows the actual pressure at the inlet port of the valve. At sudden pressure increase in the system when the inlet pressure exceeds the maximum valve setting, the valve opens until the setting and the actual pressure are equal again. Thus, assuming the flow does not exceed the capacity of the valve, the pressure at the valve inlet cannot rise faster than the operating pressure setting of the valve itself.

BRIEF SUMMARY OF THE INVENTION

This invention is directed to a pilot operated pressure valve which limits the rate of pressure rise and substantially eliminates excessive system pressure spikes. The valve includes an inlet, a hollow cylindrical main body sealingly connected at one end thereof to the inlet, a pilot chamber having a sleeve slidably mounted within the main body and an operating pressure adjustment connected to another end of the main body adjacent another end of the pilot chamber for selecting a minimum operating pressure of the valve. A main chamber receives pressurized fluid metered through a main orifice and discharges pressurized fluid through a damping orifice when the main chamber is filled and fluid inlet pressure exceeds a preselected valve operating pressure level sufficient to open a spring biased pilot ball downstream of the damping orifice. The inlet will open an exit port upstream of the main orifice for discharging pressurized fluid from the valve back to a supply tank when inlet pressure exceeds the operating pressure. Pressurized fluid is also metered from the pilot chamber through a control orifice into a loading chamber to automatically further vary the operating pressure of the valve up to its maximum pressure setting. A relief valve discharges pressurized fluid from said pilot chamber when fluid pressure there exceeds a relatively low pilot pressure.

It is therefore an object of this invention to provide a pilot operated pressure valve which genuinely exhibits a limitation of pressure spikes and a rate of pressure rise of the fluid pressure in a hydraulic system.

It is still another object of this invention to provide a pressure valve for a hydraulic system which limits the pressure within the system so as not to exceed the maximum pressure setting of the valve.

It is still another object of this invention to provide a pressure valve which limits the rate of pressure rise in a hydraulic system up to and not exceeding the maximum pressure setting of the valve.

It is yet another object of this invention to provide a pressure valve which exhibits the above features in various embodiments such as that of a pressure relief valve, a vented relief valve, a sequence valve, and a kick-down relief valve.

In accordance with these and other objects which will become apparent hereinafter, the instant invention will now be described with reference to the accompanying drawings.

BRIEF DESCRIPTION OF THE DRAWINGS

FIG. 1 is a side elevation section view of the preferred embodiment of the invention.

FIG. 2 is an enlargement of area A of FIG. 1.

FIG. 3 is a typical recorded fluid pressure rise vs. time plot of fluid pressure at the inlet of a conventional pressure valve.

FIG. 4 is a recorded fluid pressure vs. time plot similar to that of FIG. 3 of the present invention.

DETAILED DESCRIPTION OF THE INVENTION

Referring now to the drawings and firstly to FIGS. 1 and 2, the preferred embodiment is shown generally at numeral 40. This pilot operated pressure valve 40 generally includes four major components, an inlet member 42, an elongated cylindrical main body 44, a pilot chamber member 46 and a pressure adjustment member 48.

The main body 44 is sealably connected at one end thereof to, and longitudinally extending from, one end of the inlet member 42. The pilot chamber 46 includes a cylindrical sleeve 14 which is slidably mounted for limited longitudinal movement within the main body 44 and forms the side walls of a pilot chamber 24. Sleeve 14 is connected and longitudinally extends from a retainer 26 immovably held as part of the inlet member 42. The pressure adjustment member 48 is sealably and threadably connected to another end of the main body 44 at another end of the pilot chamber member 46 as shown in FIG. 1.

In general, the inlet member 42 is structured to receive pressurized fluid at system pressure. A main chamber 30 receives metered fluid flow at inlet port 1 through a main orifice 18 and transfers fluid at a pilot flow rate from the main chamber 30 through a damping orifice 22 into the pilot chamber 24 through retainer 26 when the inlet operating pressure of the valve is sufficient to unseat a biased closed pilot ball 15. The main chamber 30, including a compression spring 17, maintains the head of main piston 20 in a closed configuration shown in FIG. 1 wherein the outlet port 2 is sealed from fluid communication with the inlet port 1. When the inlet pressure rises above the preset operating pressure of the valve, fluid flow through the main orifice 18 creates sufficient pressure drop across the main orifice 18 to overcome main spring 17, whereupon pressurized hydraulic fluid will flow directly from inlet port 1 to outlet port 2 and then to a tank or reservoir at lower or zero pressure.

Pressurized fluid at inlet port 1 flows at a low pilot flow rate through the main orifice 18 positioned centrally at one end of the main piston 20. The preferred size of main orifice 18 is about 0.03" in diameter. When the main chamber 30 is filled with hydraulic fluid, the pressure in chamber 30 will generally equal that of the system pressure at inlet port 1. The pressurized fluid also flows from the main chamber 30 through a damping orifice 22 positioned centrally within a longitudinal passage 27 of retainer 26 and, when the inlet fluid pressure increases to an operating pressure initially established by the preload of pilot spring 13, the pilot ball 15 will be unseated against the biasing force produced by the pilot spring 13 within the pilot chamber 24. Thereafter, the entire pilot chamber 24 will be filled with pressurized fluid not exceeding a preestablished pilot chamber pressure of about 225 p.s.i. as described herebelow.

As pressurized fluid enters and fills the pilot chamber 24, air in the chamber, along with a very small amount of pressurized fluid is slowly discharged from a drain orifice 3 formed through the side of sleeve 14 having a preferred diameter of 0.016, a diameter sufficiently small to prevent the main piston 20 from opening due only to fluid flow rate through the drain orifice 3. A clearance gap 28 is provided between the outer cylindrical surface of sleeve 14 and the inner cylindrical surface of the main body 23 which directs fluid and air discharging from the drain orifice 3 from the valve through a relief hole 6 formed through the main body 23 adjacent one end thereof.

The flow rate required to load the pilot chamber 24 to keep the valve set at the actual pressure at port 1 is lower than the flow required to move the main piston 20 against the main spring 17.

Pressurized fluid at the relatively low pilot chamber pressure, which cannot exceed that established by a relief spring 10 acting against a relief ball 11, additionally flows from the pilot chamber 24 through a control orifice 7 to fill a loading chamber 32 and against surfaces 14a, 14b and 14c in FIG. 2 equal to the surface area of the diameter of the sleeve 23. Because the loading chamber surfaces are larger in area than that of the end 26a of the surface area of retainer 26, as pilot chamber fluid pressure increases, the compression force exerted against the pilot spring 13 is increased by sleeve 14 moving toward retainer 26 to increase the pressure against the pilot ball 15. By this arrangement of sufficiently large differential area, the operating pressure required within the main chamber 30 to unseat the pilot ball 15 increases with pilot chamber pressure to adjust the operating pressure of the valve toward its maximum setting. Thus, the minimum pilot spring force exerted to maintain the pilot ball 15 in a seated orientation is established at no or very low pilot chamber pressure by the contact of flange 34 of relief spring housing 36 within the loading chamber 32 in the position shown, while the maximum operating pressure of the valve is established when the flange 34 and sleeve 14 move to the opposite end of the loading chamber 32 in the direction of arrow B as pilot pressure is increased against the loading surfaces 14a, 14b and 14c.

Note importantly that the velocity at which the sleeve 23 moves to a maximum pilot spring preload setting is determined by the rate of fluid flow through the control orifice 7. Moreover, the fluid pressure build-up in the pilot chamber 24 preloads the pilot spring 13 to a pressure setting of the valve 40 which equals the instantaneous pressure at inlet port 1.

For example, in the preferred embodiment, the effective area for the pilot pressure to act is with respect to the open end surface 29 of the sleeve 23 which defines a differential ring area. The outer diameter of the sleeve 23 is 0.685"; the inner diameter of the sleeve 23 and the outer diameter of the retainer 26 is 0.500". The differential area, therefore, is about 0.172 sq. inch. That means a pilot chamber pressure of 225 p.s.i. exerts a force of about 38 lbs. against pilot spring 14 which is exerted against the pilot ball 15. The pilot ball seat diameter is 0.092" which defines an effective area of 0.0066 sq. inch. The pilot spring force of 38 lbs. spring force sets the valve at an operating pressure of 5757 p.s.i. The pressure in the pilot chamber 24 of 225 p.s.i. is additive to this setting so that the maximum operating pressure setting of the valve is about 6000 p.s.i.

The details of the structure of the present invention shown in enlarged area A of FIG. 2, provides the actual "soft start" functional benefits of this invention. When the pilot chamber 24 is substantially filled with pressurized fluid, a force is exerted to unseat relief ball 11 against pilot spring 10 from its seated and sealed position shown. This maximum pilot chamber pressure is preferably about 225 p.s.i. The fluid pressure rise in the pilot chamber 24 up to this relief valve ball 11 opening pilot pressure automatically adjusts further compression of the pilot spring 13 as previously described. When the relief ball 11 is unseated when the pilot pressure in the pilot chamber 24 is reached, the pressurized fluid will flow from the pilot chamber 24 through a crosshole 2, along the clearance gap 28 between the sleeve 14 and the main body 23 for discharge from the valve through relief hole 6. By this arrangement, pilot pressure within the pilot chamber 24 can never exceed the effective preset pilot pressure of about 225 p.s.i., made just sufficient to fully preload the pilot spring 13 to its maximum setting wherein flange 34 within loading chamber 32 is moved to the maximum displacement in the direction of arrow B in FIG. 2. Thus, the order of magnitude ratio between operating and pilot pressures is at least about 10 to 1 and preferably as high as about 25 to 1.

To vary the maximum operating pressure setting of the valve 40, the pressure adjustment member 48 is threadably moveable longitudinally or axially of the valve 40 to move the sleeve 24 correspondingly. This sleeve movement varies the compression preload of the pilot chamber spring 13 and the proportionately varied preload against the pilot ball 15.

In summary, the present invention limits the rate of pressure rise within an adjustable operating pressure range and further limits the maximum pressure within the valve and the system in which it is connected. Because of this pressure rate increase limitation, pressure spikes or hydraulic shock are also eliminated by the valve. The valve operating pressure at which the valve will open slowly follows the actual pressure at the inlet port 1. At sudden pressure increase above operating pressure, the valve opens to allow pressurized fluid to discharge through port 2 until such time as the operating pressure of the valve and the actual inlet pressure are again equal. Moreover, unless the fluid flow into the valve exceeds the capacity of the valve itself, the pressure cannot rise faster than the operating pressure setting of the valve.

As other pilot operated relief valves, this valve has a low pressure in the pilot chamber. for the soft start mechanism, this is important in three respects:

a. The maximum pressure drop across the orifice 7 is only 225 p.s.i. That means a low consistent flow into the loading chamber 32 which distinguishes this "soft start" valve from other soft start valves. Other valves typically have up to 6000 p.s.i. pressure differential across the orifice that controls the shift of the piston or pilot sleeve that determines the valve setting. This rate of flow into the loading chamber through orifice 7 determines the rate at which the setting of the valve changes. The rate of setting change equals the rate of pressure rise at port 1;

b. The seals 60 and 62 near each end of the sleeve member 46 see a pressure drop of only 225 p.s.i. maximum as compared to up to 6000 p.s.i. in other designs, a factor of about 27. This translates into significantly lower friction and lower hysteresis of the present invention over other such prior art valves.

c. The pilot pressure also determines the fluid losses while the valve is active. Assuming that the pressure at port 1 is within the range where the valve limits the rate of pressure rise, the valve then adjusts it's setting to the actual pressure at port 1. It does so by pressurizing the pilot chamber. A pressurized pilot chamber causes a pilot flow out through orifice 3. The lower the pressure in the pilot chamber, the lower the fluid losses.

EXAMPLE

If the pressure at port 1 is 3000 p.s.i., a pilot flow will pressurize the pilot chamber 24 to 110 p.s.i. (110 p.s.i. times effective area 0.172=18.9 lbs., 18.9 lbs./0.0066 square inch (effective area of the pilot ball) is 2890 p.s.i. plus 110 p.s.i. is 3000 p.s.i., a pressure ratio of about 27 to 1.

PERFORMANCE CURVES

Referring now to FIG. 3, a typical prior art pressure relief valve without the soft start mechanism was actually tested. The operating pressure of the valve is shown at 50 to be approximately 3500 p.s.i. That amount of fluid pressure was repeatedly introduced into the inlet port of the prior art valve, the system pressure being recorded over time shown in milliseconds. The typical damaging hydraulic pressure spike which occurred virtually instantaneously at the start of each pressure cycle is shown at 52 reaching as high as about 5400 p.s.i., over fifty percent (50%) greater than the intended operating pressure of the prior art valve.

The present invention was subjected to the same fluid pressure inlet condition, this valve having an operating pressure shown at 54 at about 5000 p.s.i. Although a pressure spike occurred at 56, it only reached about 3750 p.s.i., well below the intended operating pressure at 54 and the pressure rise shown at 58 was a gradual increase on a uniformly increasing pressure level basis. This pressure rise 58 occurred after the pilot ball 15 was unseated and the fluid in the pilot chamber 24 at a pilot pressure was rising and adjusting the operating pressure setting of the valve to its maximum. Thus, all system shock and damaging excessive fluid pressure has been eliminated by this invention.

ALTERNATE EMBODIMENT

The basic structure of the present invention as above described may be easily modified within the intended scope of this invention. One such alternate embodiment is in the form of a vented relief valve achieved by adding another exit port in the main body 23 which is in fluid communication with another crosshole positioned between the damping orifice 22 and the pilot ball 15. This produces a very low crack or opening pressure of the piston 20 to exit port 2, depending upon the preload of the main spring 17. Since this valve would be vented downstream of the damping orifice 22, a second pilot relief valve at exit port 2 is remotely controlled. By selectively closing this third port, the setting of the valve rises quickly to the minimum pressure setting as above described. If the pressure at the inlet port 1 rises further, the valve limits the rate of pressure rise again as previously described.

Another embodiment of this invention is in the form of a sequence valve which would include a third port through the main body 23 rather than through port 2 via the relief ball 11 and crosshole 2 of FIGS. 1 and 2. Such a sequence valve could be used to control the movement of hydraulic actuators wherein, if the pressure at inlet port 1 rises because a first actuator is fully extended, the valve would open and another actuator connected to port 2 would begin to move. Conventional sequence valves open abruptly causing shocks as previously described when the first actuator comes to a mechanical stop, the adaptation of the present invention rather insuring a smooth transition.

Still another alternate embodiment of the present invention is in the form of a kick-down relief valve which would incorporate a crosshole extending from the main chamber 30 to the seating surface of the piston 20. This embodiment would also eliminate the main orifice 18 so that this valve would open and stay open if the pressure rise at the inlet port exceeds the maximum rate of pressure rise of the valve. The valve would remain open once it is opened because the proposed crosshole in the piston sees the pressure much lower than the pressure at port 1 because of the high rate of fluid flow across the end of the crosshole as fluid moves between port 1 and port 2.

Because all of these alternate embodiments incorporate the relief valve arrangement at the opposite end of the pilot chamber as shown and described in FIG. 2, they also possess this actually realized "soft start" feature with no excessive start-up pressure spikes above the operating pressure of the valve.

A further alternate embodiment of the invention is in a form which incorporates the essential aspects of this invention to pilot operate an external main stage. To accomplish this, the main chamber 30 of this invention would be connected to the main chamber of a conventional pilot operated relief valve. The invention itself could be built without the main stage, i.e. without the main piston 20, the spring 17, the damping orifice 22 and without crossholes in the sleeve 42.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A pilot operated pressure valve comprising:
   an elongated inlet member, an elongated cylindrical hollow main body sealingly connected at one end thereof to and longitudinally extending from said inlet member, an elongated pilot chamber member having a pilot chamber and being mounted within a cylindrical interior of said main body and longitudinally extending at one end thereof from said inlet member, and a pressure adjustment member adjustably sealingly connected to another end of said main body at another end of said pilot chamber member;
   said inlet member including an inlet port at one end thereof, an outlet port a retainer sealingly connected to another end of said inlet member, a piston slidably mounted within said inlet member, and a main spring positioned within and extending longitudinally along a main chamber formed centrally between said retainer and said piston;
   a head of said piston defining one end of said main chamber and including a main orifice adjacent said inlet port which allows a relatively small quantity of pressurized fluid at said inlet port to be metered into and fill said main chamber;
   said retainer including a longitudinally extending damping orifice in fluid communication with said main chamber which allows a relatively small quantity of pressurized fluid in said main chamber to be metered into said pilot chamber from said main chamber;
   said main spring biasingly urging said piston into sealing engagement against said inlet port until a predetermined inlet pressure equal to a maximum operating pressure of said valve is reached whereupon said piston is opened by axial movement thereof against said main spring to allow pressurized fluid to enter said inlet port and to exit said valve directly from said outlet port;
   said pilot chamber member including an elongated pilot spring acting at one end thereof within an elongated sleeve of said pilot chamber member against a pilot ball to seal pilot chamber up to a first predetermined fluid pressure within said main chamber;
   said sleeve longitudinally positionable by said pressure adjusting member within said main body to vary a length of said pilot spring and thus to vary the first predetermined inlet pressure which is required to unseat said pilot ball;
   said sleeve including a crosshole closed to fluid communication with said pilot chamber by a relief spring biasingly engaged at one end thereof against a relief ball, said relief ball being unseated at a preselected pilot pressure within said pilot chamber to allow pressurized fluid to flow from said pilot chamber through said crosshole and through a relief hole of said main body to exit said valve whereby the pilot pressure in said pilot chamber is substantially below the operating pressure of said valve;
   said sleeve also including a control orifice which allows a relatively small quantity of pressurized fluid in said pilot chamber to be metered therefrom and to fill a loading chamber defined between another end of said sleeve and said pressure adjustment member;
   said loading chamber having a net surface area greater than that of said retainer whereby said sleeve is moveably urged against said pilot spring to selectively vary the valve operating pressure between a minimum and a maximum valve operating pressure.

2. A pilot operated pressure valve as set forth in claim 1, further comprising:
   a drain orifice in said sleeve which allows a relatively small quantity of pressurized fluid and air in said pilot chamber to be metered slowly from said pilot chamber and exiting said valve through a relief hole in said main body.

3. In a pilot operated pressure valve comprising an elongated inlet member, an elongated cylindrical hollow main body sealingly connected at one end thereof to and longitudinally extending from said inlet member, an elongated pilot chamber member having a pilot chamber and being mounted within a cylindrical interior of said main body and longitudinally extending at one end thereof from said inlet member, and a pressure adjustment member adjustably sealingly connected to another end of said main body at another end of said pilot chamber member, said inlet member including an inlet port at one end thereof, an outlet port, a retainer sealingly connected to another end of said inlet member, a piston slidably mounted within said inlet member, and a main spring positioned within and extending longitudinally along a main chamber formed centrally between said retainer and said piston, a head of said piston defining one end of said main chamber and including a main orifice adjacent said inlet port which allows a relatively small quantity of pressurized fluid at said inlet port to be metered into and fill said main chamber, said retainer including a longitudinally extending damping orifice in fluid communication with said main chamber which allows a relatively small quantity of pressurized fluid in said main chamber to be metered into said pilot chamber from said main chamber, said main spring biasingly urging said piston into sealing engagement against said inlet port until a predetermined inlet pressure equal to a maximum operating pressure of said valve is reached whereupon said piston is opened by axial movement thereof against said main spring to allow pressurized fluid to enter said inlet port and to exit said valve directly from said outlet port, said pilot chamber member including an elongated pilot spring acting at one end thereof within an elongated sleeve of said pilot chamber member against a pilot ball to seal fluid flow through said damping orifice up to the operating pressure within said main chamber, said sleeve also including a control orifice which allows a relatively small quantity of pressurized fluid in said pilot chamber to be metered therefrom and to fill a loading chamber defined between another end of said sleeve and said pressure adjustment member, said loading chamber having a net traverse surface area greater than that of said retainer whereby said sleeve is moveably urged against said pilot spring to selectively vary the valve operating pressure between a minimum and a maximum valve operating pressure, the improvement comprising:

said sleeve including a crosshole closed to fluid communication with said pilot chamber by a relief spring biasingly engaged at one end thereof against a relief ball, another end of said relief spring supported against another end of said sleeve, said relief ball being unseated at a pilot pressure within said pilot chamber to allow pressurized fluid to flow from said pilot chamber through said crosshole and through a relief hole of said main body to exit, the pilot pressure being substantially lower than the operating pressure of said valve;

a drain orifice in said sleeve which allows a relatively small quantity of pressurized fluid and air in said pilot chamber to be metered slowly from said pilot chamber and exiting said valve through a relief hole in said main body.

* * * * *